Dec. 22, 1953   J. H. DRILLICK   2,663,232
COMPOSING APPARATUS
Filed June 29, 1950   4 Sheets-Sheet 4
Fig. 13, 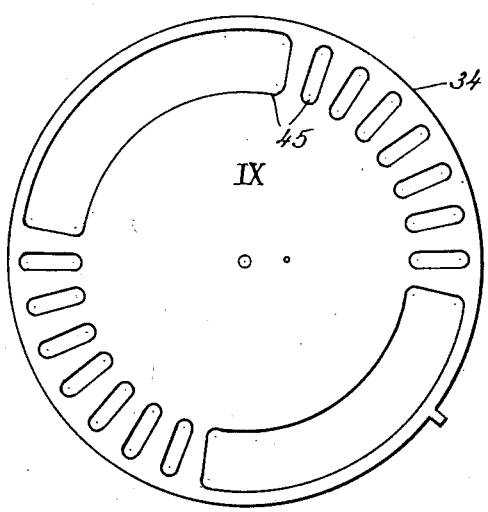
Fig. 14, 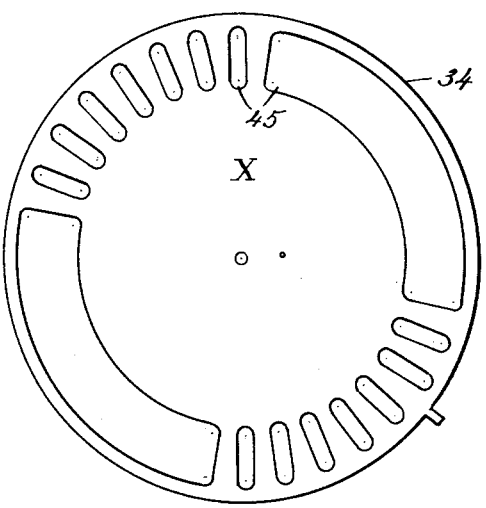
Fig. 15, 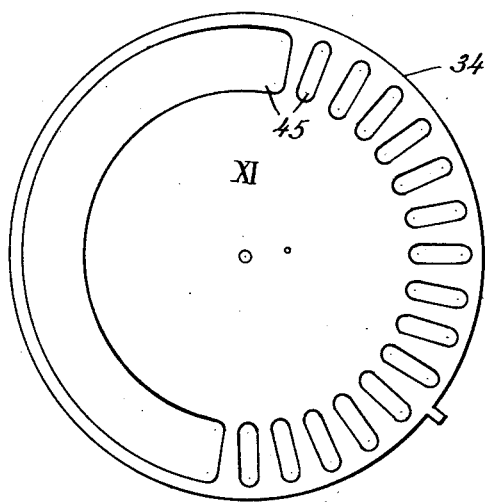
Fig. 16, 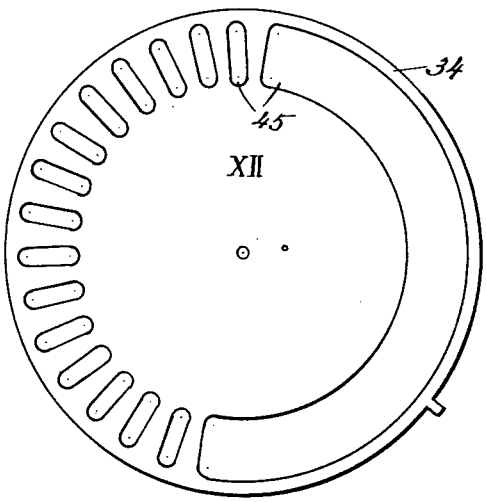
Fig. 17, 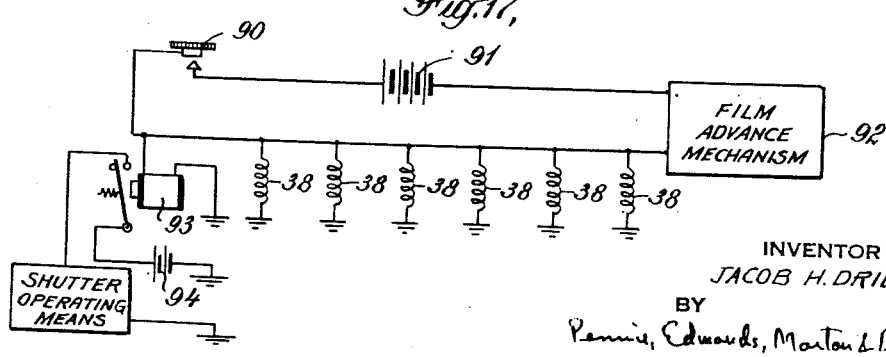
INVENTOR
JACOB H. DRILLICK
BY
Pennie, Edmonds, Morton & Barrows
ATTORNEYS Patented Dec. 22, 1953

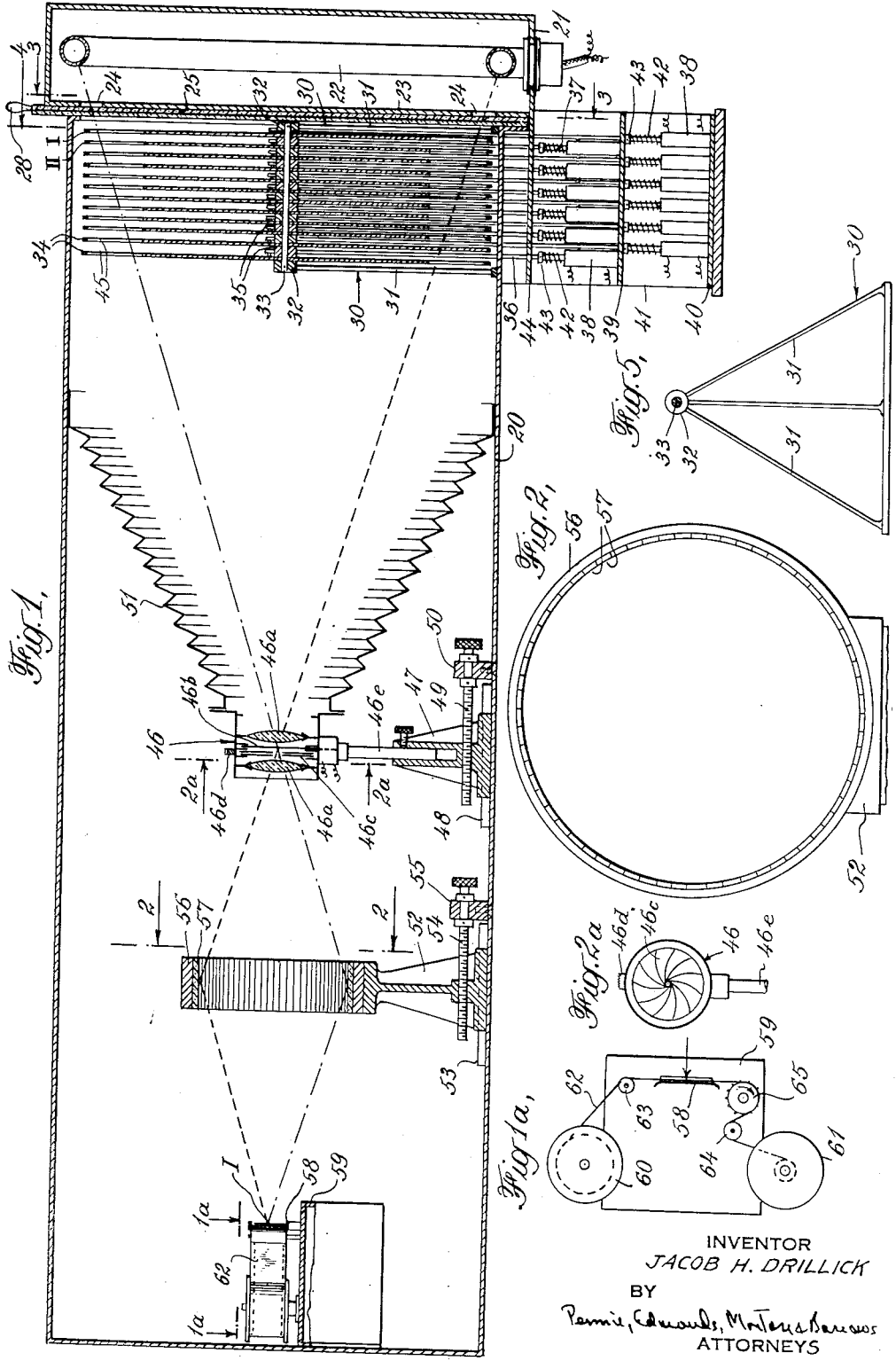

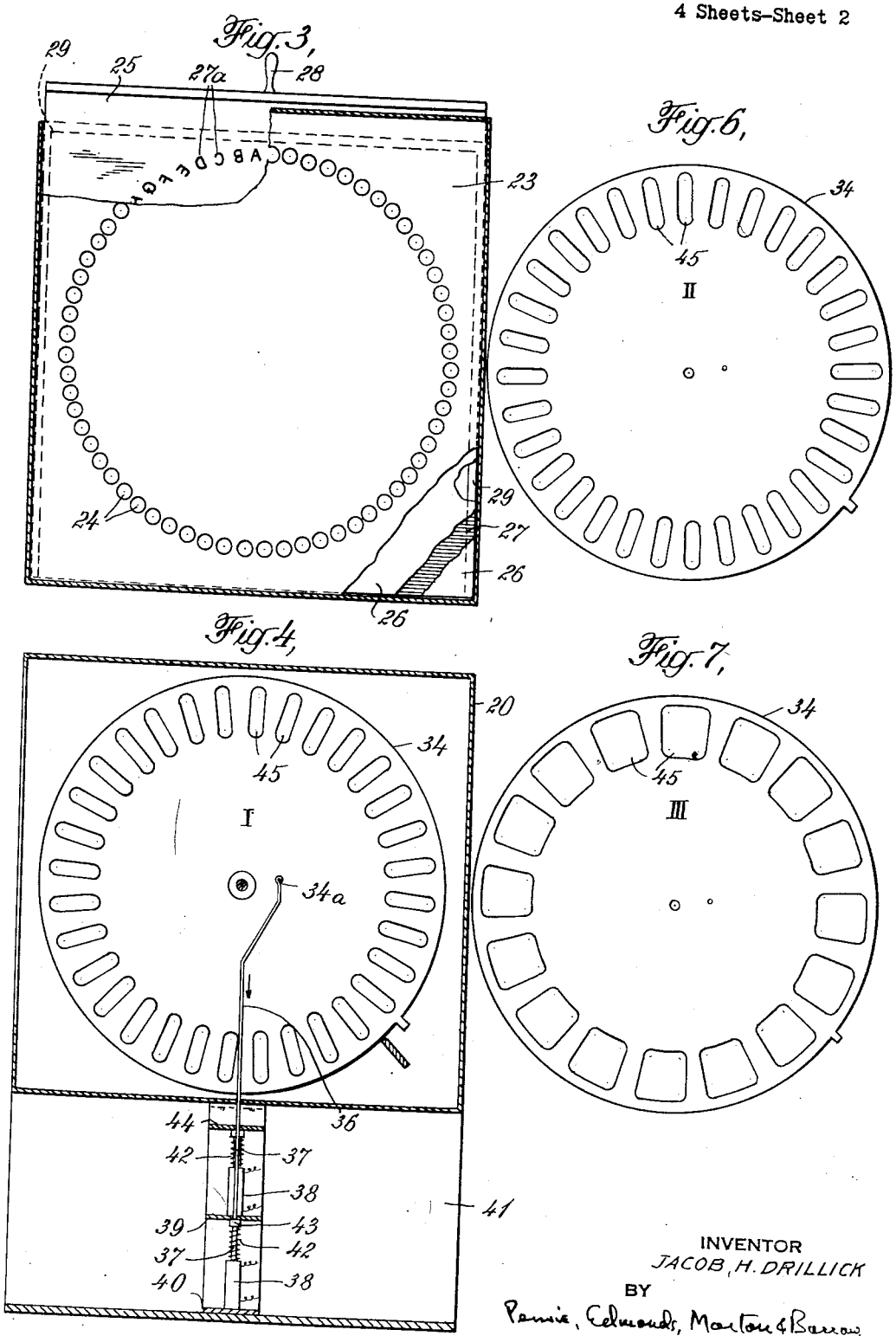

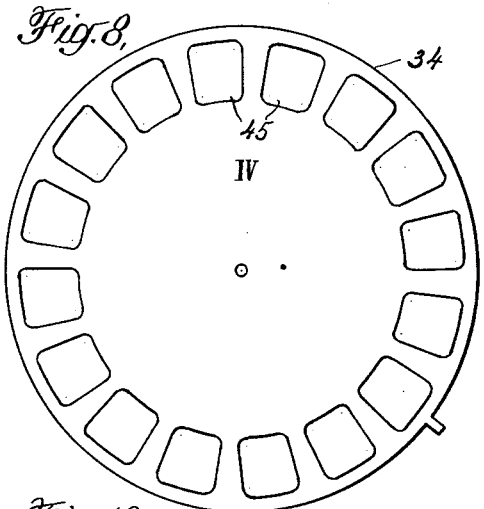
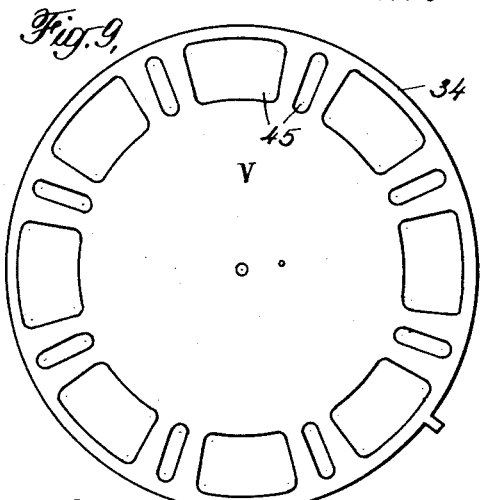
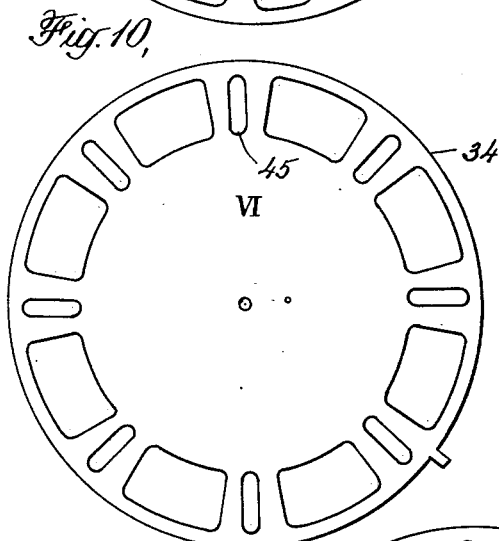
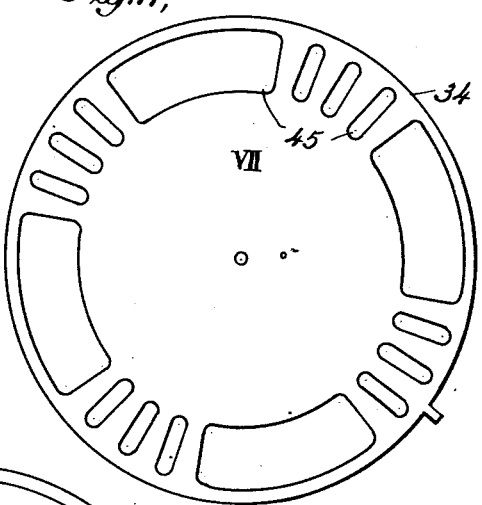
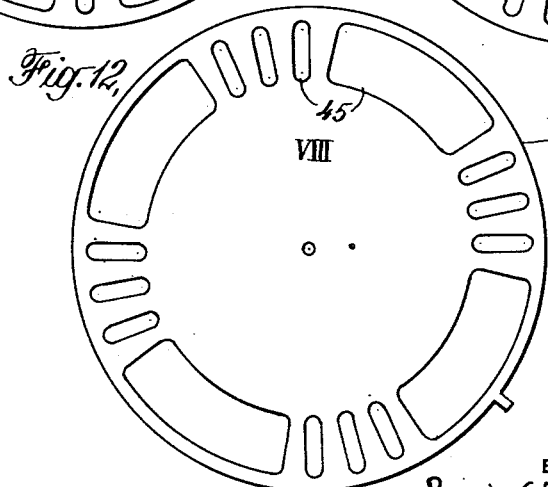

2,663,232

UNITED STATES PATENT OFFICE 2,663,232

COMPOSING APPARATUS

Jacob H. Drillick, Brooklyn, N. Y., assignor to The Phototypograph Corporation, Dover, Del., a corporation of Delaware Application June 29, 1950, Serial No. 171,161

3 Claims. (Cl. 95—4.5)

This invention relates to phototypographs, and and in particular to novel means for selecting the particular character to be printed. This application is a continuation-in-part of my application Serial No. 154,291, filed April 6, 1950, now abandoned.

My invention provides an improved system of shutters operating to permit the ready selection of individual characters from the whole array of characters constituting the font on the object screen as desired and constructed to be especially suitable for use with a punch tape memory device.

For a better understanding of the invention, reference may be made to the accompanying drawings in which:

Fig. 1 is a view in vertical longitudinal section of a photocomposing machine embodying the new system in a preferred form;

Figs. 1a, 2, 2a, 3 and 4 are sectional views on the lines 1a—1a, 2—2, 2a—2a, 3—3 and 4—4 respectively of Fig. 1;

Fig. 5 is a view in elevation of a detail of the shutter-array support 30 of Fig. 1;

Figs. 6 to 16, inclusive, are views in elevation from the direction of the light source 22 of the selector shutters employed in the device;

Fig. 17 is a wiring diagram of the device of Fig. 1.

A phototypograph according to my invention in the form shown in Figs. 1-17, inclusive, comprises a lightproof housing 20, at one end of which is a casing 21 containing a source of light diagrammatically indicated at 22. The inner end wall 23 of the casing 21 is opaque except for a plurality of apertures 24 arranged in a circular series. The top wall of housing 20 is provided with a transverse slot adjacent wall 23, through which a slide 25 may be inserted.

The slide is preferably made of a pair of transparent plates 26 of glass, for example, with a sheet 27 between, the sheet 27 being opaque except for a set for sixty-four type characters 27a arranged in a circular series, which lie in front of apertures 24, when the slide is in position. The circular arrangement of the characters 27a on the slide 25 has been adopted for convenience and not of necessity. In this arrangement each character may occupy up to one sixty-fourth of a complete circle which may be thought of as a character unit space. Any other predetermined arrangement of characters can be adopted. The sheet 27 may be made of any suitable material, such as a transparent plastic coated so as to be opaque execpt for the characters, or, if the reverse contrast is desired, opaque characters on a transparent rectangular ground can be employed the size of rectangular ground depending on the width of its particular character. The slide 25 is provided at its top with a handle 28, by which any given slide may be readily replaced by another, for example, by one bearing characters of a different style. The slide 25 is held in place against the inner face of wall 23 by flanges 29 projecting inwardly from the walls of housing 20.

A pair of standards 30 are mounted on the bottom wall of housing 20, each standard comprising three thin metal strips 31, of which the central strip is vertical and the outer strips converge upwardly to meet the central strip. The strips are so positioned as to lie opposite blank spaces between adjacent apertures 24 on wall 23 and, thus, between adjacent characters on the slide 25. At its top, each standard supports a collar 32 and a rod 33 is carried by the two collars and lies normal to the plane of the slide and with its axis passing through the center of the circular series of apertures 24. A plurality of selector shutters 34 in the form of disks are mounted loosely on the rod and adjacent shutters are separated by collars 35 fast on the rod. Each shutter has an eccentric pin 34a, to which is attached one end of a rod 36 extending through an opening in the bottom wall of housing 20 and connected to the core 37 of a solenoid 38. The solenoids for selector shutters are mounted in upper and lower groups attached to upper and lower plates 39, 40 carried by a standard 41 supporting one end of housing 20. Each of the rods 36 is encircled by a spring 42 bearing at one end against a collar 43 on the rod and, at the other end, against the end of the solenoid, to the core of which the rod is attached. The rods attached to cores of solenoids in the upper group are guided in openings in a plate 44 attached to standard 41 and overlying the solenoids, and the rods attached to cores of solenoids in the lower group pass through aligned openings in plates 39 and 44.

In the apparatus disclosed in Figs. 1-17, the slide 25 carries sixty-four type characters equally spaced in a circle and there are twelve of the selector shutters 34, shown in Figs. 4 and 6 to 16, inclusive, and designated I to XII, inclusive. Of these, the shutters designated I is not necessary for the selection of characters, but cooperates with the shutter designated II to permit all the characters 27a to be blocked off at once. The selector shutter disks have openings 45 lying in registry with characters on slide 25, each opening having a width sufficient to unmask the widest single character on the slide or being wide enough to span a plurality of characters completely unmasking the end characters of the group. No opening 45, however wide, is separated from an adjacent opening 45 by an opaque portion wider than necessary to block off completely the widest single character 27a. Also, each opening 45 extends inward radially a substantial distance beyond its associated character on the slide.

The disks 34 may be considered in pairs of odd and even designated disks, i. e., disks I and II, III and IV, V and VI, . . . and the disks of a pair are similar. Thus disks I and II both have thirty-two openings and, in the normal position of the disks, the openings in disk I lie opposite even numbered characters 27a in the series on slide 25, i. e., opposite B, D, F, . . . , and the openings in disk II lie opposite odd numbered characters in the series, i. e., opposite A, C, E, . . . It thus follows that when disks I and II are in their normal position all characters 27a are blocked off. To accomplish the selection of any desired character with my complete shutter mechanism, the several shutters are positioned so that all but the desired one of the characters are blocked off. In principle, therefore, only disk II is necessary for this selection operation and disk I is provided only to permit all characters to be blocked off if desired. The disks of each successive pair have identical openings, but the two disks of a pair are of different orientation with respect to the characters 27a. Whenever a solenoid 38 associated with a particular disk 34 is energized, that disk is rotated about rod 33 through an angle equal to the spacing between the centers of adjacent characters on the slide 25 by a downward movement of rod 35 from what has been termed its normal to its off-normal position.

In order to arrange the disks 34 so that there are aligned openings in all twelve disks in registry with a selected type character, it is necessary to move six of the disks from normal. Thus, in order to permit light from the source to pass through the type character A at the top of the series on slide 25 and through aligned openings in all of the disks, disks I, IV, V, VII, IX and XI are shifted from their normal positions. To pass a beam of light from the source through character B and aligned openings in all the disks, it is necessary to shift from normal disks II, III, VI, VIII, X and XII. To pass a beam of light from the source through character C and aligned openings in all the disks, it is necessary to shift from normal disks I, III, VI, VII, IX and XI. The disks in the group required to be shifted from normal to unmask any given character in the series differ from those in the group required to be shifted from normal to unmask any other character, and the shifting of the groups of disks to cause a particular character to be photographed is accomplished by selector means to be described.

The shutters 34 here described are constructed on a binary system as both mechanical and electrical simplicity are thus assured and the movement of shutter elements is reduced to the minimum. Consider each character 27a on slide 25 to occupy a unit space of one sixty-fourth of a complete circle. Disk II has thirty-two evenly-spaced, single-unit openings separated by thirty-two single-unit mask areas. It will, in its normal position, block one-half of the characters 27a, e. g. the "even" ones B, D, F, . . . as shown in the drawings. In its off-normal position it will block the other half, e. g. the "odd" ones A, C, E, . . . Disks III and IV have sixteen evenly-spaced, triple-unit openings separated by sixteen single-unit mask areas. When disk III is in its normal position, it is arranged to block one-half of the even characters; in its off-normal position, one half of the odd. When disk IV is in its normal position, it is arranged to block the half of the even characters not blocked by disk III in normal position; in its off-normal position, the half of the odd not blocked by disk III in off-normal position. Each succeeding pair of disks V—VI, VII—VIII, IX—X and XI—XII is so constructed and oriented as to be disposable to block either half of the openings possibly remaining unblocked by the preceding disks. To control sixty-four unit spaces eleven such disks are required, operating as already explained. For each doubling of the number of unit spaces which may be controlled, it is necessary to add another pair of disks.

The shutters 34 may be located anywhere between the light source 22 and the film 62. Location near the cell 46 permits the use of smaller shutters. Location near the entrance to mirrors 57 permits the shutters 34 to limit the size of the ray cone reaching the reflecting surface and the iris diaphragm 46c may be dispensed with.

A cell 46 containing a lens made up of elements 46a, an electrically operated exposure shutter 46b between the elements 46a and an iris diaphragm 46c is carried by a standard 46e mounted in front of the selector shutters 34 for vertical adjustment in a carriage 47 movable in guideways 48 extending lengthwise centrally of housing 20 and attached to the bottom wall thereof. The effective aperture of the lens may be limited by means of the iris diaphragm 46c through control 46d for the purpose explained below. The carriage 47 is movable by an adjustment screw 49 threaded through the carriage and through a block 50 attached to the bottom wall of the housing. A light-proof bellows 51 is attached to the rim of the cell 45 at the rear side thereof and to the inner walls of housing 20.

A second carriage 52 lies in front of the cell 46 and is movable in guideways 53 attached to the bottom wall of housing 20 and aligned with guideways 48. The position of carriage 52 can be varied by means of an adjustment screw 54 threaded through the carriage and through a block 55 attached to the bottom wall of housing 20. Carriage 52 carries at its upper end a ring 56 containing a plurality of mirrors 57 attached to its inner surface and facing inwardly. There is one mirror for each type character on slide 25 and the mirrors are so placed that, when light from the source 22 passes through a given type character, aligned openings in shutters 34, and cell 46, the light strikes the optically corresponding one of the mirrors 57 and the image of the character is reflected to an image spot, which is the same for all the characters. In order that the character images may be erect after reflection in the mirror 57 when projected onto the image spot on film 62, the characters are tilted on the slide 25, as shown in Fig. 3. Facing slide 25 from cell 46, the tilt given each character can be determined according to this rule. Taking top dead center as 0°, a character at that position would be right-side up and vertical. Each successive character in a clockwise direction from top dead center is tilted about its own center clockwise through an angle of twice its displacement from 0°. Thus a character at 10° clockwise displacement from top dead center is tilted 20° clockwise from the vertical; a character at bottom dead center (180° displacement), having been tilted through 360° is right side up and vertical again. In order that the entire cone of rays passing cell 46 and forming the image of the character being projected be reflected by a single mirror 57 and not overlap onto adjacent mirrors, the effective aperture of the lens must be small enough to limit the size of that cone, so that as the cone strikes the reflecting surface its diameter is not greater than the width of the mirror.

A film gate 58 is mounted horizontally on bracket 59 at the end of housing 20 remote from light source 22. Film supply reel 60 and take-up reel 61 are likewise mounted on bracket 59. A length of film 62 is fed from reel 60 across film gate 58 over guide rolls 63, 64 by a precision driven sprocket 65, which can be driven by any suitable means (not shown) to accomplish the desired spacing of charatcer images on film 62.

The machine is operated by a keyboard containing a plurality of keys and, when a key is depressed, a picture of a selected type character may be made on the film or the operation of the keyboard may set up a memory or storage means, which later causes an entire line of characters previously selected to be photographed on the film. A simplified wiring diagram, in which the keyboard acts directly, is shown in Fig. 17. In the diagram, key 90 which is typical of all the other keys, is in circuit with a source 91 and a device generally designated 92 for operating sprocket 65 to pull film 62 across gate 58 stepwise by the space appropriate for the character to be photographed. Closing of the circuit by key 90 causes current to flow to the carriage advance mechanism and also to solenoids 38 of these six selector shutters 34 which must be moved to open a path through the shutters for a beam traveling through the particular type character selected by the key. In addition, the closing of the circuit causes current to flow to a slow-acting relay 93 in a circuit with a source of energy 94 and the means for operating the exposure shutter 46b. Accordingly, when a type character is to be photographed, the key 90 corresponding to that character is depressed and, immediately thereafter, the sprocket 65 is rotated to bring an appropriate amount of unexposed film 62 to the image spot and six of the disks 34 are shifted, so that light from source 22 may pass through the selected character and aligned openings in the disks to cell 46. After a brief interval, the exposure shutter 46b is operated and light travels through cell 46 to the appropriate one of the mirrors 57, which reflects the light in such manner that an erect image of the character is projected on the focal spot on the film. The photographing of the characters continues until a line is completed, whereupon sprocket 65 is actuated to advance the film an appropriate amount for an interline space. The machine is then ready for photographing a new line of characters on the film.

Whenever a change in the form of type to be used is desired, the slide 25 in use in the machine is removed and a slide carrying the characters of the desired form is placed in position. In the machine shown in Figs. 1–16, each slide carries a group of sixty-four characters, but, if desired, each slide may carry a greater or less number of characters. If the slide has more than sixty-four characters, additional selector shutters 34 will be required, the size and arrangement of the openings in the shutters will be varied, and it will be necessary to move a greater number of the selector shutters for the selection of a character. The formation of the selector shutters for any number of type characters in a series may be readily worked out by the binary number system. The ring 56 used in apparatus adapted for slides bearing a given number of characters will carry as many mirrors as there are characters on the slide and a slide carrying a different number of characters requires use of a ring 56 having the number of mirrors appropriate for that slide.

I claim:

1. In a phototypograph, a photographic film, means for moving the film to bring successive portions thereof to an image spot, a light source, a flat slide in front of the source carrying type characters arranged in a circular series at a uniform unit spacing on a ground of different light transmitting property, a plurality of selector shutters mounted in front of the slide for rocking movement on a common axis normal to the plane of the slide and passing through the center of the series of characters, each shutter having a plurality of openings of integral unit-space width separated from adjacent openings by a single unit-space width in a circular series, said openings being in registry with characters on the slide, the shutters differing from one another in the width, number and arrangement of their openings and being rockable on said axis to shift their openings one unit-space width to either of two alternate positions along the series of characters on the slide, manually operable selector means for rocking selected shutters to their respective desired alternate position to provide a single free path for a beam from the source through a selected character and aligned openings in the shutters and optical means for bringing the beams passing through all the characters and the shutters to a focus upon the image spot.

2. In a phototypograph, a photographic film, means for moving the film to bring successive portions thereof to an image spot, a light source, a flat slide in front of the source carrying type characters arranged in a circular series at a uniform unit spacing on a ground of different light transmitting property, a plurality of selector shutters mounted in front of the slide for rocking movement on a common axis normal to the plane of the slide and passing through the center of the series of characters, each shutter having a plurality of openings of integral unit-space width separated from adjacent openings by a single unit-space width in a circular series, said openings being in registry with characters on the slide, the shutters differing from one another in the width, number and arrangement of their openings and being rockable on said axis to shift their openings one unit-space width to either of two alternate positions along the series of characters on the slide, a solenoid for each shutter operable to rock the shutter to one alternate position and a spring for restoring the shutter to its other alternate position, manually operable selector means for energizing selected solenoids to cause the associated shutters to rock to their respective desired alternate position to provide a single free path for a beam from the source through a selected character and aligned openings in the shutters, and optical means for bringing the beams passing through all the characters and the shutters to a focus upon the image spot.

3. A phototypograph according to claim 1 in which the character series has an even number of character spaces, at least one of the selector shutters has only openings of a single unit-space width, the additional shutters are arranged in oppositely oriented pairs, and the shutters of at least one of said pairs each has one opening of 180° and the balance of its openings of unit-space width.

JACOB H. DRILLICK.

References Cited in the file of this patent

UNITED STATES PATENTS

| Number | Name | Date |
|---|---|---|
| 849,027 | Steinmetz | Apr. 2, 1907 |
| 1,944,111 | Schieren | Jan. 16, 1934 |
| 2,036,498 | Rantsch | Apr. 17, 1936 |
| 2,180,417 | Huebner | Nov. 2, 1939 |
| 2,392,224 | Bryce | Jan. 1, 1946 |
| 2,486,406 | Higonnet | Nov. 1, 1949 |

FOREIGN PATENTS

| Number | Country | Date |
|---|---|---|
| 711,918 | France | July 8, 1931 |